UNITED STATES PATENT OFFICE.

JOHN HARGER, OF TORONTO, ONTARIO, CANADA.

PRESERVING BUTTER.

SPECIFICATION forming part of Letters Patent No. 240,126, dated April 12, 1881.

Application filed August 11, 1880. (No specimens.) Patented in Canada July 10, 1880.

*To all whom it may concern:*

Be it known that I, JOHN HARGER, of Toronto, in the Province of Ontario, Dominion of Canada, have invented a new and useful Improvement in Preserving Butter, of which the following is a specification.

The object of this invention is to prevent butter from becoming rancid, and to preserve its flavor, so that it will remain sweet for a long time even in very warm weather.

The invention consists in the mode of preserving butter by incorporating with the milk or cream before churning, and with the butter after churning, boracic acid dissolved in hot glycerine, and sulphate of potassium dissolved in boiling water, as will be hereinafter fully described.

In carrying my invention into practical effect I dissolve one pound of boracic acid in five pounds of hot glycerine. I next dissolve one pound of sulphate of potassium in five pounds of boiling water. These two solutions I then pour together to form my preserving compound.

When the milk or cream is placed in the churn for churning I add thereto two table-spoonfuls of the compound for each gallon of milk or cream. The quantity of the solution used may be varied according to the season of the year, a little more being used in very warm weather and a little less when the weather is cooler. When the butter has been produced and the buttermilk worked out I add to the butter two table-spoonfuls of the compound for each pound of butter, and thoroughly work it into the butter. Butter thus treated will keep fresh and sweet for a long time in any climate.

In defining my invention more clearly with respect to the prior state of the art, I would state that I am aware that borax has been dissolved in glycerine for preserving fruit, and that sulphate of potash has been used for assisting in the preservation of milk. I do not know, however, that free boracic acid has ever been used in connection with sulphate of potash for preserving the butter by treatment of the same direct or by preliminary treatment of the butter-globules in the cream.

Having thus fully described my invention, I claim as new and desire to secure by Letters Patent—

1. The mode of preserving butter by incorporating with the milk or cream, before churning, and with the butter after churning, boracic acid dissolved in hot glycerine and sulphate of potassium dissolved in boiling water, substantially as herein shown and described.

2. The mode of preserving butter by incorporating with the milk or cream, before churning, boracic acid dissolved in hot glycerine and sulphate of potassium dissolved in boiling water, substantially as herein shown and described.

3. The mode of preserving butter, substantially as herein shown and described, by incorporating with the butter, after churning, boracic acid dissolved in hot glycerine and sulphate of potassium dissolved in boiling water, as set forth.

4. The herein-described composition of matter to be used for the preservation of butter, consisting of boracic acid dissolved in hot glycerine and sulphate of potassium dissolved in boiling water, in the proportions specified.

Dated at Toronto, Canada, August 2, 1880.

JOHN HARGER.

Witnesses:
 J. T. CARTER,
 JOS. PEASE.